Oct. 4, 1966 C. E. PLYMALE ET AL 3,277,220
METHOD FOR MAKING COMPOSITE FOAMED PLASTIC CONTAINERS
Original Filed Jan. 3, 1961 4 Sheets-Sheet 1
FIG. 1
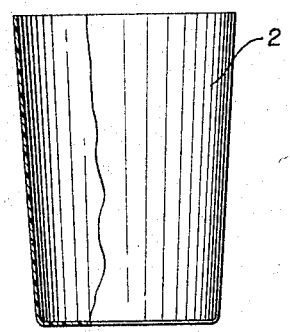
FIG. 2
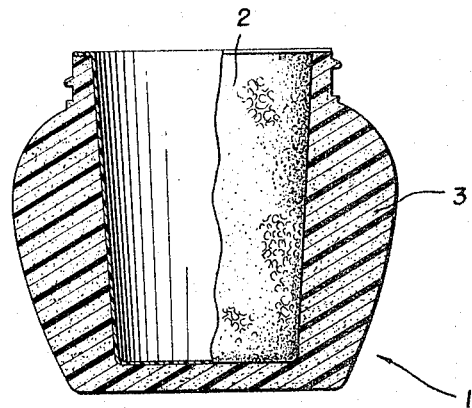
FIG. 3
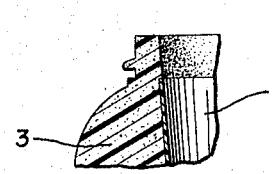
FIG. 2a
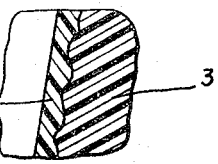
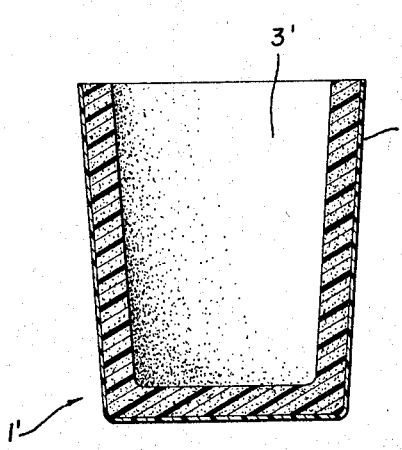
FIG. 4
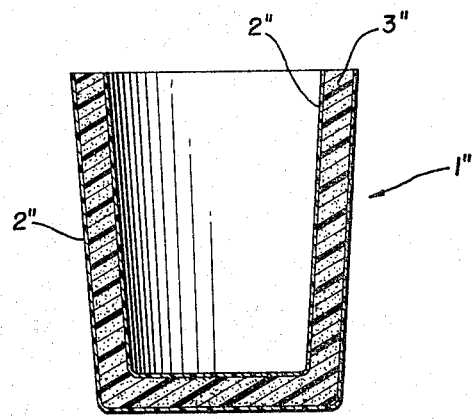
FIG. 5
INVENTORS
C. E. PLYMALE
CARLTON A. RICHIE
BY Claron N. White
and W. A. Schaich
ATTORNEYS

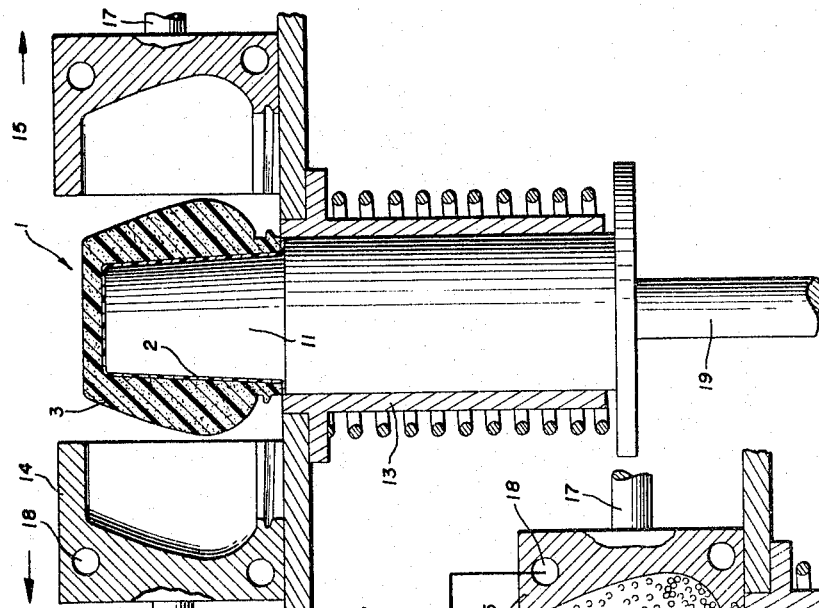
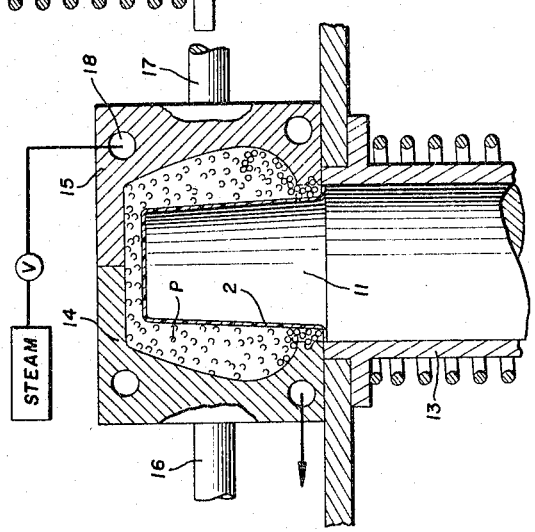
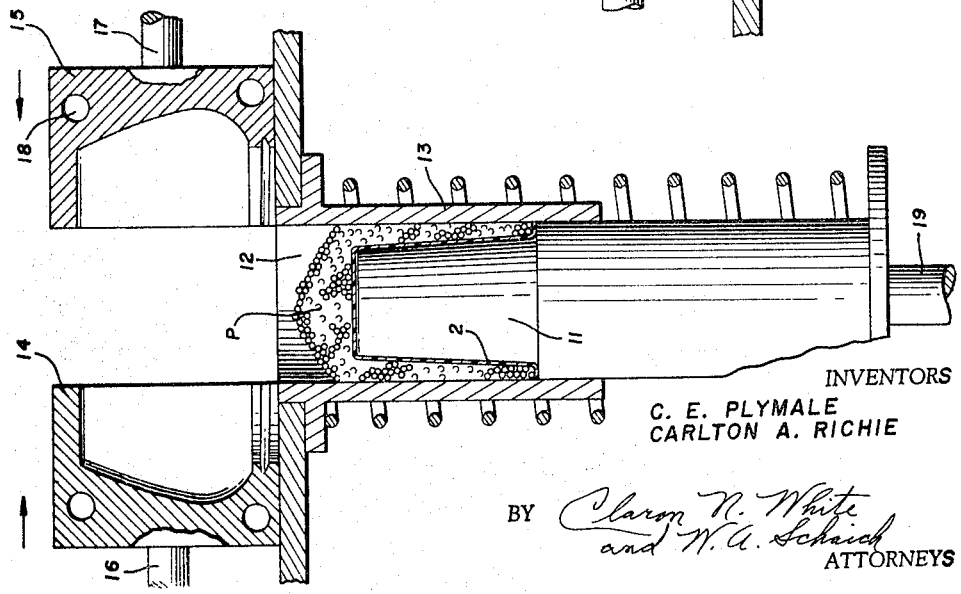

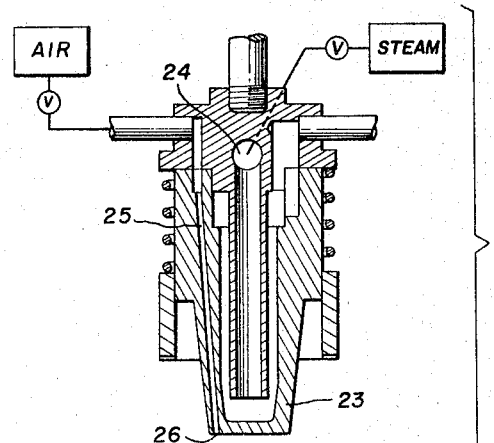
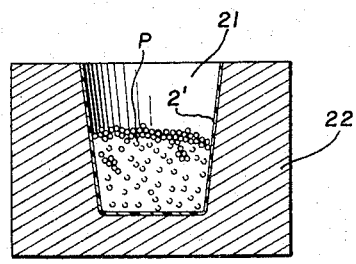
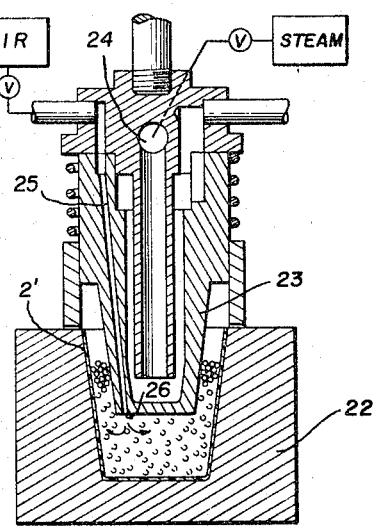
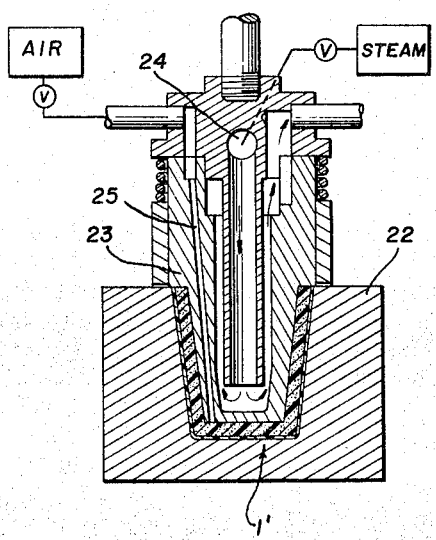
FIG. 9
FIG. 10
FIG. 11
INVENTORS
C. E. PLYMALE
CARLTON A. RICHIE
BY Claron N. White
and W. A. Schaich
ATTORNEYS Oct. 4, 1966   C. E. PLYMALE ET AL   3,277,220
METHOD FOR MAKING COMPOSITE FOAMED PLASTIC CONTAINERS
Original Filed Jan. 3, 1961   4 Sheets-Sheet 4
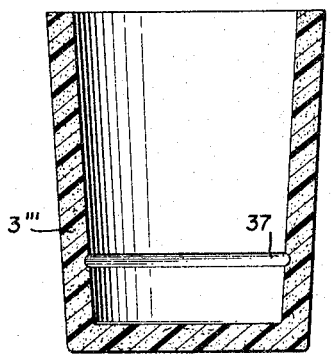
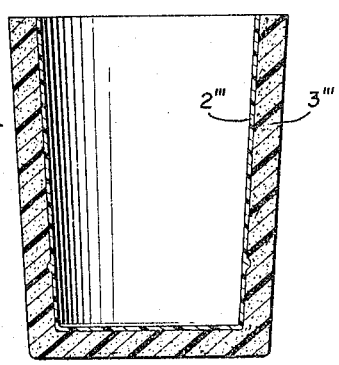
FIG.12
FIG.13
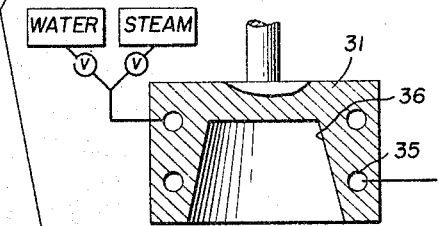
FIG.14
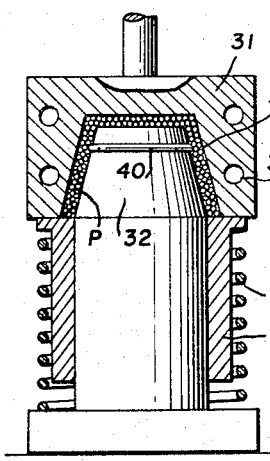
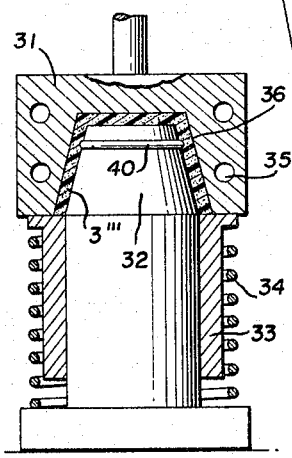
FIG.15   FIG.16
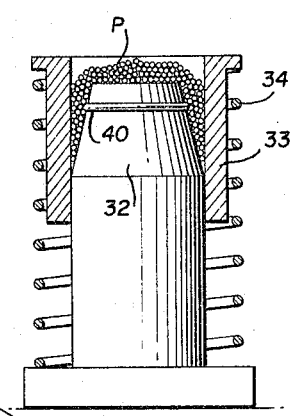
INVENTORS
C. E. PLYMALE
CARLTON A. RICHIE
BY
ATTORNEYS United States Patent Office 3,277,220
Patented Oct. 4, 1966

3,277,220
METHOD FOR MAKING COMPOSITE FOAMED PLASTIC CONTAINERS
Charles E. Plymale, Maumee, and Carlton A. Richie, Toledo, Ohio, assignors to Owens-Illinois Glass Company, a corporation of Ohio
Original application Jan. 3, 1961, Ser. No. 80,382. Divided and this application Feb. 4, 1963, Ser. No. 255,893
3 Claims. (Cl. 264—45)

This application is a division of our copending application Serial No. 80,382, filed January 3, 1961, now abandoned.

This invention relates generally to the molding of plastic articles, such as containers, bottles, and jars, consisting of at least two plastic layers of different densities and having improved properties. More specifically, the present invention is directed to plastic containers having a dense, smooth, plastic layer integrally bonded to a cellular or foamed layer of plastic beads, and to methods for making the same.

The use of plastic containers for packaging various cosmetic and medicinal liquids and creams is well known. By way of example, the use of squeeze bottles made of a plastic such as polyethylene has proven very satisfactory and has gained wide acceptance. However, for certain purposes, such as the merchandising and sale of a cosmetic or cold cream, custom has created the demand for a relatively thick-walled, rigid container or jar, and although such a jar could very well be made or cast of solid polyethylene, not only does the cost of such a container per se rise sharply, but also the expense incident to shipping the same.

The use of glass for cold cream jars is well known for such purpose, but a glass jar is quite fragile and subject to being dropped and broken, in addition to being relatively heavy. Accordingly, it would be highly desirable in the packaging art to provide a jar which would be neither fragile, like glass, nor unduly expensive, as a solid plastic article would be, and yet relatively light in weight when compared with similar articles made from either glass or solid plastic. Such light weight containers would facilitate handling besides resulting in substantial savings with respect to the cost of shipping the containers.

It is, therefore, an object of this invention to provide a novel economical method of molding plastic container which is not fragile, consisting of two or more plastics of different densities.

Another object of this invention is to provide a method of molding a plastic container consisting of two or more plastics of different densities, wherein the plastics are integrally bonded and interlocked together.

A further object of this invention is to provide a method of molding a container which is easier to handle and less expensive to ship due to its lightness.

Still another object of this invention is to provide a method of molding a plastic container which is lighter in weight than a container made of glass or a solid plastic.

According to the present invention, it has been discovered that plastic containers can be satisfactorily obtained by employing a relatively impervious, dense and solid plastic layer, such as polyethylene, as a liner and binding thereto a continuous but relatively pervious cellular or formed layer of expanded plastic beads, such as cellular polystyrene beads.

Other objects and advantages of the foregoing invention will become more apparent from the following detailed description taken in conjunction with the accompanying drawings, in which:

FIG. 1 is an elevational view, partly in section, of the liner employed in the making of a cosmetic jar in accordance with the present invention;

FIG. 2 is a sectional view of the completed jar, using the liner of FIG. 1 which is shown partly in elevation and section;

FIG. 2a is an enlarged fragmentary sectional view of the area of contact between the liner and layer of expanded plastic beads;

FIG. 3 is a sectional view of the lip or finish area of a container of modified construction;

FIG. 4 is a sectional view of a modified construction;

FIG. 5 is a sectional view of a further modified construction;

FIG. 6 is a sectional view showing a molding apparatus suitable for making the article of FIG. 2;

FIG. 7 is a sectional view of the mold apparatus of FIG. 6 in closed position;

FIG. 8 is a sectional view of the apparatus of FIG. 7 upon completion of the molding cycle;

FIG. 9 is a sectional view showing a molding apparatus suitable for making the article of FIG. 4;

FIG. 10 is a sectional view of the mold apparatus of FIG. 9 in closed position;

FIG. 11 is a sectional view of the apparatus of FIG. 10 upon completion of the molding cycle;

FIG. 12 is a sectional view of a modified form of a liner and matching outer layer;

FIG. 13 is a sectional view of the elements of FIG. 12 in assembled form; and

FIGS. 14, 15 and 16 are sectional views of apparatus suitable for making the article of FIG. 13.

Referring to FIG. 2, jar 1 is a representative container of the present invention, consisting of the plastic liner 2 shown in FIG. 1 and wherein the liner 2 is completely encased by a cellular mass or layer 3 of expanded plastic beads. It will be noted that where the expanded plastic has been removed from the inner liner, as shown in FIG. 2, there has been imparted to the surface of the liner a dimpled effect which has the salutary effect of serving as an interlocking means to bond the liner 2 to the overlying cellular plastic mass 3.

The novel containers of FIG. 2 can be made in a number of ways, and suggested apparatus for making these containers is disclosed in FIGS. 6, 7 and 8. By way of example, the liner 2, which can be preformed by plastic sheet shaping apparatus well known in the art, is mounted on a force plug 11 of the same size and configuration as shown in FIG. 6. The lower mold cavity 12, which is defined by force plug 11 mounted on ram 19 and spring mounted tube 13, is then partially filled with a measured amount of expandable polystyrene beads P. The split female mold members 14 and 15 are then brought into a closed position by rams 16 and 17, respectively, and force plug 11 is caused to move upward and assume the position as shown in FIG. 7. Due to the bead nature of the molding material plus the coaction of plug 11, sleeve 12, and mold members 14 and 15, a uniform distribution of the beads will take place.

Steam then enters the heating coils 18 embedded in the walls of the mold cavity, and causes the plastic beads to coalesce and expand into a cellular mass which becomes firmly bonded to the plastic liner 2. Upon cooling, the mold is opened as shown in FIG. 8, and the completed jar is removed. The bonding between the liner 2 and cellular mass 3 is essentially mechanical in nature, since the plastic beads, upon expanding, form rounded projections which project into the liner to form indentations. These projections and indentations match and complement each other so as to form a strong mechanical interlock. Of course, in the preferred method the liner is one which softens on the application of heat in the expansion step.

Polyethylene is one preferred material for the liner. The spring in FIGS. 6–8 merely aids in retraction of ram 19 and can be omitted.

From the foregoing description, it will be apparent that one method of manufacturing the novel article of FIG. 2 of the present invention, wherein the liner is internally positioned, has been disclosed. However, to those skilled in the art, other methods of preparing these articles could be employed in which other types of apparatus would be involved.

Although the example above stresses the use of a liner coated with a thick layer of expandable plastic beads, it is apparent that for certain purposes the reverse construction may be desired. For example, in FIG. 4, there is shown a modification in which the container 1' has the expandable plastic 3' positioned on the inside and the plastic "liner" 2' now becomes a coating. Apparatus suitable for making the article of FIG. 4, wherein the liner is externally positioned, is shown in FIGS. 9, 10 and 11.

The first step in making the article of FIG. 4 consists in positioning liner 2' within a mold cavity 21 of female mold member 22. Thereafter, liner 2' is filled with a measured amout of expandable plastic beads P, as shown in FIG. 9, so as to form the proper thickness of expandable plastic bead layer in the subsequent molding step. Force plug 23 then enters the mold cavity 21 and, when the plug reaches the position shown in FIG. 10, air enters channel 25 and exits through opening 26 into the cavity defined by plug 23 and mold 22, thereby causing a distribution of the plastic beads within this cavity. When the force plug 23 reaches its lowermost point, a heating fluid is then introduced into a channel 24 within plug 23 so as to expand and coalesce the expandable plastic as shown in FIG. 11. Upon cooling, the mold is then opened and container 1' is removed.

It will also be obvious to those skilled in the art that the two molding steps shown by FIGS. 6–8 and 9–11 could be combined whereby a plastic liner not only covers the force plug but the mold cavity. Thereafter, a prescribed amount of expandable plastic beads is introduced into the mold cavity, the mold is then closed, and heat is applied so as to obtain the finished container 1" of FIG. 5, which has plastic liners 2" and 2" enclosing the expandable plastic 3". Still other modifications can be made. In FIG. 1, the liner 2 is shown as coming to the very end of the mouth of the jar. However, for certain purposes, it is desirable to have the liner end just short of the mouth of the jar so that the threaded lip area or finish of the jar will be made entirely of the expandable plastic beads, as shown by FIG. 3.

It is to be understood that although the type of mechanical interlock shown in FIG. 2, wherein the liner is indented by the beads of the outer cellular layer, is preferred, other expedients can be employed to cause the liner and cellular layer to adhere to one another. For example, a glue or adhesive can be used which can be applied to the inside of a preformed liner, which is then inserted onto a matching preformed inner cellular layer to form an article similar to FIG. 4 except for the presence of a thin layer of glue between the inner foamed plastic layer 3' and liner 2'.

Other examples of a plastic cellular layer mechanically interlocking with a plastic liner include the use of a matching cellular plastic layer and liner, which are preformed with such close tolerances that they can be press-fit together to form an integral article similar to FIG. 4. Moreover, the liner 2''' and outer matching cellular plastic layer 3''' can be made with a protuberance or bead 38 and an indentation or groove 37, respectively (FIG. 12), which are in alignment when the liner is firmly seated in the outer layer thereby forming an integral article 1''' (FIG. 13). One apparatus which can be used to make layer 3''' is shown in FIGS. 14, 15 and 16.

Referring to FIG. 14, a molding apparatus (in open position) is shown as consisting essentially of a reciprocable upper female mold 31 having openings 35 for the introduction of heating and cooling fluids, and having a cavity 36 corresponding to a lower male mold plug 32. Surrounding the mold plug is a loading tube 33 mounted on springs 34.

At the beginning of the molding operation, as illustrated by FIG. 14, a measured amount of expandable plastic beads, such as polystyrene beads, is placed in the top of the mold plug 32. More specifically, the beads can be said to have been placed in an open lower mold structure or cavity of varying capacity and contour whose boundaries are defined by plug 32 and loading tube 33. Some of the beads will fall down into the crevice between the plug 32 and the loading tube 33, but most of them will be retained in a pile on top of the plug. When the upper mold is lowered, it will first contact the loading tube and gradually force it downward. As the loading tube retracts, the beads piled on the end of the plug will fall down into the space formed between the mold plug and female mold cavity. As the mold cavity reaches its lowest position, as shown in FIG. 15, a complete uniform distribution of the plastic beads occurs due to gravity and cooperative action of the mold parts.

From the foregoing, it will be evident that the loading tube cooperates with the mold plug to form a receptacle or reservoir of varying contour and capacity for the retention and distribution of the beads. Heat is then applied by injecting steam into openings 35 of mold 31, which in turn heats the plastic beads P causing them to expand and fuse together. After the container is formed, the mold is permitted to cool, and mold 31 is then raised which results in the loading tube returning to its extended position. In so doing, it will force the molded container off the mold plug. If desired, a channel (not shown) can be drilled in plug 32, which would terminate at the top surface of the plug. By connecting a source of air under pressure thereto, which is an expedient well known in the art, the finished article could be jet ejected from the final molding station.

It is also apparent that the resulting article illustrates several advantages over known articles used for the same purpose. For example, the present article is very resistant to mechanical shock and is not subject to breaking upon being dropped as similar shaped containers of glass would. Moreover, although the container is thick walled, a considerable saving of plastic has been obtained by using expanded plastic beads as the outer covering or lamina. Furthermore, the container of this invention is lighter in weight than similar articles made of solid plastic or glass. In addition, the use of the plastic beads has resulted in the formation of a strong mechanical interlock between the inner liner and the outer plastic beads which, upon being heated in the molding process, were caused to expand and as a result embedded themselves in the liner so as to lock the liner and surrounding mass of plastic beads into an integral unit, as illustrated by FIG. 2a.

It will be noted that where the plastic beads contacted the mold, a smooth surface resulted since the beads, in expanding were flattened out against the harder enveloping mold. This smooth surface is desirable since it permits the ready affixing of suitable labels, printed matter, or colored ornamental patterns. Although the outer surface of this layer is smooth, the individual beads, which have been fused together, are still discernible to the naked eye. As a result, the plastic layer, which consists of foamable plastic beads fused together, is permeable to air and most vapors due to the presence of minute passages between the interstices of the closely packed and fused beads. This is in contrast to the plastic liner which is substantially impervious.

It will be evident that various plastic liners can be employed of which polyethylene, polystyrene, and polypropylene are representative. One method of making the liners employed in the present invention is set forth in U.S. Patent No. 2,910,728 (see 2''' of FIG. 12). In addition, expandable plastic beads other than the expandable polystyrene beads referred to above can be employed.

A particularly suitable polystyrene plastic is that designated as "Dylite" which is in the form of beads and made by the Koppers Company, Inc. These beads can be given a pre-expansion treatment by heating them at 180–240° F., very often in the presence of live steam, until a density of, say, 2–15 lbs. per cubic foot is obtained. The beads inserted into the molding apparatus in the method of the invention are usually partially pre-expanded, but they can also be beads which have received no pre-expansion treatment. These polystyrene beads contain a volatile liquid, pentane, as an expanding agent. However, particulate polystyrene containing any volatile liquid expanding agent or containing one of the solid chemical expansion agents which decompose to yield a gaseous expansion agent on heating can be employed. Although a polymer of styrene is preferred, any thermoplastic containing such a volatile liquid or solid chemical expansion agent, giving it the capability of being foamed upon the application of heat, can be used in the method of the invention. Of course, the apparatus of FIGS. 6–8 and 9–11 can be employed to prepare the preformed cellular plastic layer such as 3″ of FIG. 12 by using a mold of appropriate configuration.

While we have described and illustrated preferred embodiments of our invention, we wish it to be understood that we do not intend to be restricted solely thereto, but that we do intend to cover all modifications thereof which would be apparent to one skilled in the art and which come within the spirit and scope of our invention.

We claim:
1. The method of forming a composite integral thermoplastic relatively rigid container for packaging a product, said container including a solid dense relatively flexible thermoplastic liner having an inner surface and an outer surface and a continuous cellular layer of expanded and fused plastic beads, said layer being substantially thicker than said liner, said method comprising the steps of placing one of said surfaces of said thermoplastic liner, having said one surface in its ultimate configuration, into entire contact with a mold member of an opened two-part mold having two mold members forming when closed a mold cavity, said contact being with the molding surface of said mold member, thereafter covering at least in part the other of said surfaces of the liner with expandable plastic beads, then providing relative movement between the two mold members to close the mold, the amount of beads being sufficient for the beads to be uniformly distributed throughout the closed mold cavity, applying sufficient heat to said plastic beads to expand and partially fuse said beads whereby said expanded beads indent the thermoplastic liner where the liner is contacted by the plastic beads and thereby there is formed an integral interlocking of the thermoplastic liner with the cellular layer of expanded plastic beads, cooling the resultant product, opening the mold, and removing the product from the opened mold.

2. The method of claim 1 in which the liner is positioned internally with respect to the cellular layer of expanded beads by placing the inner surface of the liner in contact with one of said mold members and the outer surface of the liner is the surface covered with the expandable plastic beads and in which the composition of the liner is polyethylene.

3. The method of claim 1 in which the liner is positioned externally with respect to the cellular layer of expanded beads by placing the outer surface of the liner in contact with one of said mold members and the inner surface of the liner is the surface covered with the expandable plastic beads.

References Cited by the Examiner

UNITED STATES PATENTS

| | | | |
|---|---|---|---|
| 1,810,896 | 6/1931 | Grubman | 264—249 XR |
| 2,149,991 | 3/1939 | Dodge | 156—294 XR |
| 2,150,910 | 3/1939 | Chaplin | 229—1.5 XR |
| 2,591,578 | 4/1952 | McNealy et al. | |
| 2,753,642 | 7/1956 | Sullivan | 264—45 XR |
| 2,950,505 | 8/1960 | Frank | 264—45 |
| 2,951,260 | 9/1960 | Harrison et al. | 264—53 XR |
| 2,977,639 | 4/1961 | Barkhuff et al. | |
| 2,989,783 | 6/1961 | Slapnik | 264—45 |
| 3,002,640 | 10/1961 | Kline. | |
| 3,007,594 | 11/1961 | Wallace. | |
| 3,013,922 | 12/1961 | Fisher | 264—45 |
| 3,042,967 | 7/1962 | Edberg | 264—53 |

FOREIGN PATENTS

| | | |
|---|---|---|
| 497,226 | 11/1950 | Belgium. |
| 582,122 | 8/1959 | Canada. |
| 675,765 | 2/1930 | France. |
| 323,759 | 1/1930 | Great Britain. |
| 596,847 | 8/1959 | Italy. |

ALEXANDER H. BRODMERKEL, *Primary Examiner.*

ROBERT F. WHITE, *Examiner.*

P. E. ANDERSON, *Assistant Examiner.*